US008203822B2

(12) United States Patent
Hemon et al.

(10) Patent No.: US 8,203,822 B2
(45) Date of Patent: Jun. 19, 2012

(54) DIGITAL SQUIB DRIVER CIRCUIT

(75) Inventors: Erwan Hemon, Goyrans (FR); Philippe Lance, Toulouse (FR)

(73) Assignee: Freescale Semiconductor, Inc., Austin, TX (US)

( * ) Notice: Subject to any disclaimer, the term of this patent is extended or adjusted under 35 U.S.C. 154(b) by 183 days.

(21) Appl. No.: 12/598,307

(22) PCT Filed: May 11, 2007

(86) PCT No.: PCT/IB2007/052714
§ 371 (c)(1),
(2), (4) Date: Feb. 12, 2010

(87) PCT Pub. No.: WO2008/139276
PCT Pub. Date: Nov. 20, 2008

(65) Prior Publication Data
US 2010/0165538 A1    Jul. 1, 2010

(51) Int. Cl.
*F23Q 3/00*    (2006.01)
(52) U.S. Cl. ........................................ 361/247
(58) Field of Classification Search .............. 361/247, 361/248
See application file for complete search history.

(56) References Cited

U.S. PATENT DOCUMENTS

| | | | | |
|---|---|---|---|---|
| 4,313,379 A | * | 2/1982 | Wallace | 102/217 |
| 5,261,694 A | * | 11/1993 | White et al. | 280/735 |
| 6,166,451 A | | 12/2000 | Pigott | |
| 7,385,307 B2 | | 6/2008 | Hemon et al. | |
| 7,667,940 B2 | * | 2/2010 | Turpin et al. | 361/93.1 |
| 7,777,364 B2 | * | 8/2010 | Hemon et al. | 307/9.1 |
| 7,940,513 B2 | * | 5/2011 | Hemon et al. | 361/247 |
| 2004/0108698 A1 | | 6/2004 | Rothleitner | |
| 2005/0269879 A1 | * | 12/2005 | Hemon et al. | 307/10.1 |
| 2006/0000948 A1 | | 1/2006 | Ooyabu | |
| 2007/0289855 A1 | | 12/2007 | Schumacher | |
| 2009/0115489 A1 | | 5/2009 | Hemon et al. | |

FOREIGN PATENT DOCUMENTS

| | | |
|---|---|---|
| DE | 10344841 A1 | 5/2005 |
| DE | 102004010135 A1 | 9/2005 |
| EP | 1602532 A | 12/2005 |
| GB | 2319871 A | 6/1998 |
| WO | 01/94158 A | 12/2001 |
| WO | 2006/101705 A | 9/2006 |

OTHER PUBLICATIONS

International Search Report and Written Opinion correlating to PCT/IB2007/052714 dated Feb. 15, 2008.

* cited by examiner

*Primary Examiner* — Ronald W Leja

(57) ABSTRACT

A driving circuit for generating a required firing current for a safety device comprising an arrangement of a first transistor (M2) connected in series with a second transistor (M3); and a power control transistor (M1) connected in series with the first transistor; characterised in that the first and second transistors operate in fully switched on mode (Rds(on)) and the required firing current (I(squib)) is generated by means of varying the voltage (Vc) across the gate source of power control transistor and the first and second transistors in a predetermined manner.

17 Claims, 5 Drawing Sheets

US 8,203,822 B2

DIGITAL SQUIB DRIVER CIRCUIT

FIELD OF THE INVENTION

This invention relates to a digital squib driver architecture and design, in particular but not exclusively for the automotive industry.

BACKGROUND OF THE INVENTION

The automotive industry has for many years provide vehicles with electronically controlled elements. For example, the elements may be an airbag for deployment in the event of an accident or crash. The crash is detected typically in about 10-15 milliseconds. Then an electric signal is sent to fire the airbag. This is typically accomplished by means of squib which ignites a propellant (e.g. sodium azide) which generates a gas (e.g. nitrogen) which in turn inflates the airbag. This stage typically takes about 45-55 milliseconds and then within a further 75-80 milliseconds the airbag deflates. A squib is a small explosive device or other firing device for a safety device or other type of device: for example, an airbag activating component.

The energy required to fire the squib is generally provided by a reservoir capacitor. This capacitor must store as much energy as possible and as such the voltages is typically high (~35V). An example of a current squib driver circuit has an output driver comprising two switches (a high-side and a low-side). The high-side is driven in a current limitation mode which generates a very high energy requirement for the power MOSFET. For example 35V and 2.1 A for a 1 ms period would equate to 73.5 mJ. As the MOSFET size is related to the amount of energy to be absorbed, the higher the energy the larger the MOSFET. This can have a large impact on the size and cost of the ASIIC.

Airbag applications also call for a safing switch in order to increase the overall safety by adding redundancy. This is achieved by providing a power switch that is off until a redundant microchip allows the firing of the squib. The redundant chip and squib are in series. These guarantees that the squib does not fire the airbag until all crash algorithms and validation are completed to confirm the need for airbag deployment. The safing switch is generally an external MOSFET device 110.

One object of the present invention is to overcome at least some of the disadvantages of the prior art. A further object of the present invention is to reduce the size of components in a driving circuit.

SUMMARY OF THE INVENTION

The present invention provides a method and apparatus as described in the accompanying claims.

BRIEF DESCRIPTION OF THE DRAWINGS

Reference will now be made, by way of example, to the accompanying drawings, in which.

DETAILED DESCRIPTION OF THE PREFERRED EMBODIMENTS

Figure 1:
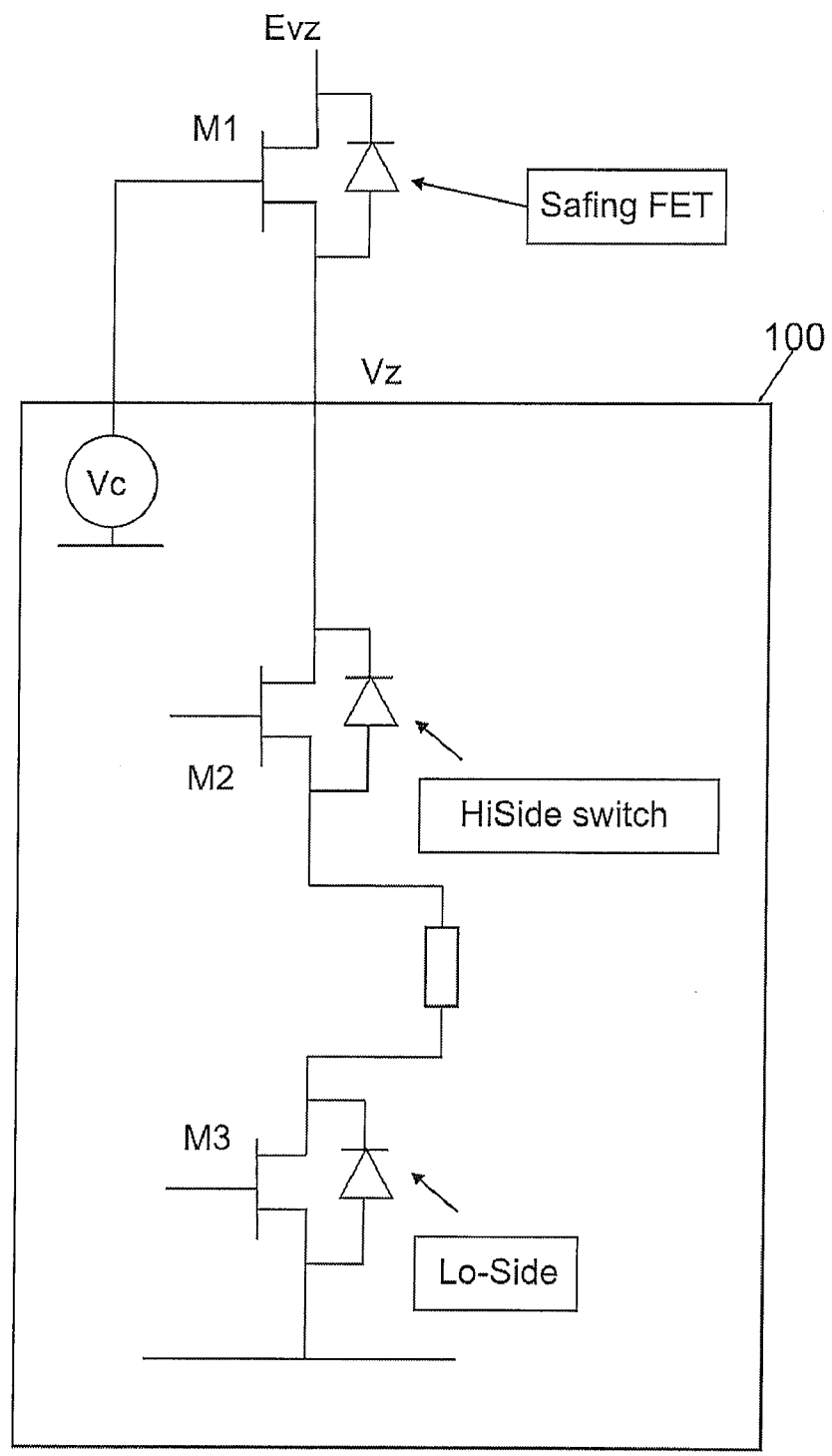
FIG. 1 is a basic circuit diagram of a digital squib driver in accordance with one embodiment of the present invention.

Referring to FIG. 1 a digital squib driver 100 is shown. The squib driver may be used to drive a squib firing in any application including automotive applications. The squib driver includes a safing MOSFET M1 a hi-side switch M2 and a lo-side switch M3. Both M2 and M3 are driven in full Rds (on) mode. This means that the transistor is fully turned on. The squib current I (squib) is regulated by means of the safing MOSFET M1. The Vc voltage across the gate-source of M1, M2 and M3 regulates the voltage on Vz based on previous diagnostics, including for example resistance measurements of the squib ($R_{squib}$) high-switch ($R_{HS}$) or low switch ($R_{LS}$). The value of I(squib) is thus equal to Vz/R total. R total is equal to the sum of $R_{squib}$, $R_{HS}$ and $R_{LS}$. $R_{HS}$ and $R_{LS}$ are known and vary with temperature in a predictable manner which can be determined by measurements. $R_{squib}$ typically varies from 1.7Ω to 4.7Ω but may be higher in certain circumstances. $R_{squib}$ may also be determined by measurements.

With these resistance measurements a control circuit (not shown) can control $V_C$ such that the firing current is of the required value whilst M2 and M3 are kept fully switched on in Rds(on) mode. This circuit arrangement in accordance with an embodiment of the present invention is much less complex and overcomes many of the disadvantages associated with the prior art. Notably, some of the problems of size of MOSFETs M2 and M3 and overall circuit complex predrivers; thermal problems associated with the switches; and energy issues are all ameliorated or overcome.

Figure 2:
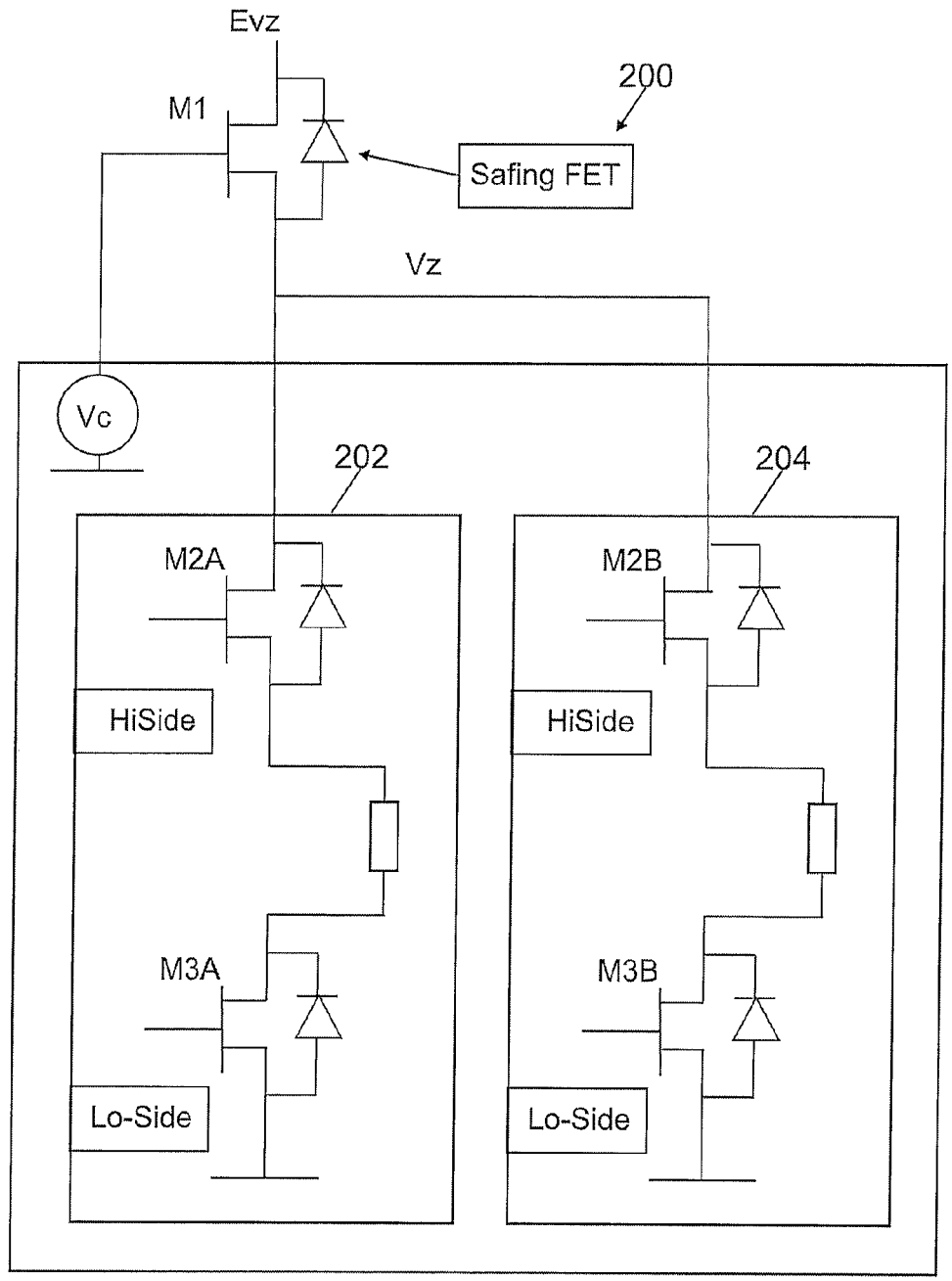
FIG. 2 is a basic circuit diagram of a two stage firming digital squib driver in accordance with one embodiment of the present invention.

In certain circumstances two stage firing is required. The circuit in FIG. 2 is an example of an embodiment which operates two or more firings at a time. The circuit shown generally at 200 includes a safing MOSFET M1 and two firing circuits 202 and 204. Each firing circuit is equivalent to that in FIG. 1 and includes respectively high-side and low-side switches which include MOSFETS (M2 A & B and M3 A & B). All the MOSFETS are driven in full Rds(on) mode. If the squib resistance for each are different there will be different currents required for firing the squib. In order to ensure that both squibs fire the value of $V_C$ need to be adjusted to provide the higher of the two calculated currents. This is clearly less than optimal for the squib which requires the lower current and for overall current consumption.

This can be rectified, at least in part by using a balancing technique within each circuit 202 and 204. There are many different ways in which this can be achieved including:

rebalancing with a series impedance;
preventing simultaneous firing
including variable resistors in one or other circuit.

Figure 3:
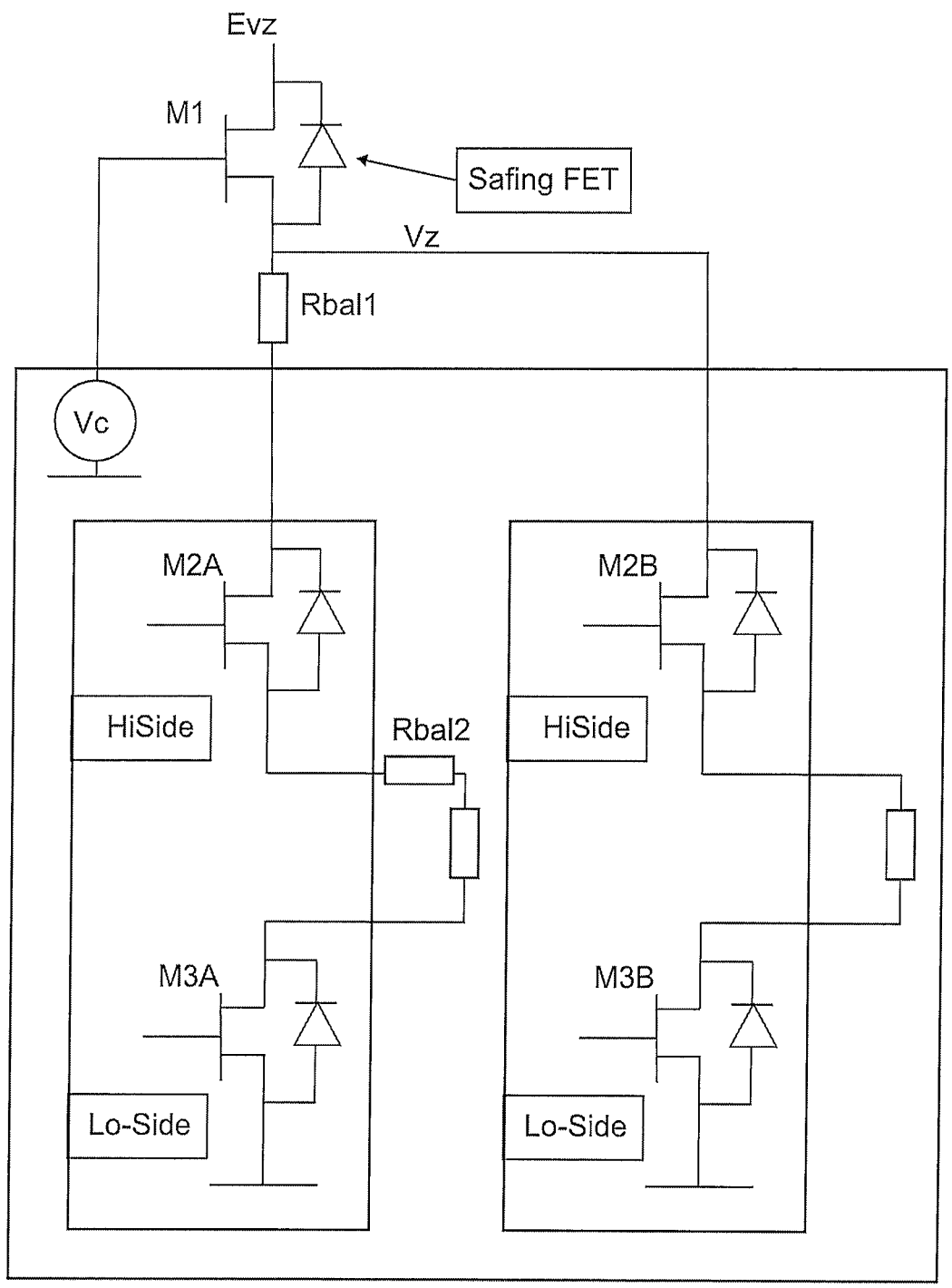
FIG. 3 is a basic circuit diagram similar to FIG. 3 showing a first balancing technique in accordance with one embodiment of the present invention.

FIG. 3 shows a first balancing technique. Assuming that squib resistance does not substantially change during the squib life, it is possible to add on additional resistance $R_{bal1}$ or $R_{bal2}$ as shown in FIG. 3. This means that the total resistance from $V_Z$ to ground is roughly equal for each squib output and thus the generated firing current is more optimal for both squibs.

Figure 4:
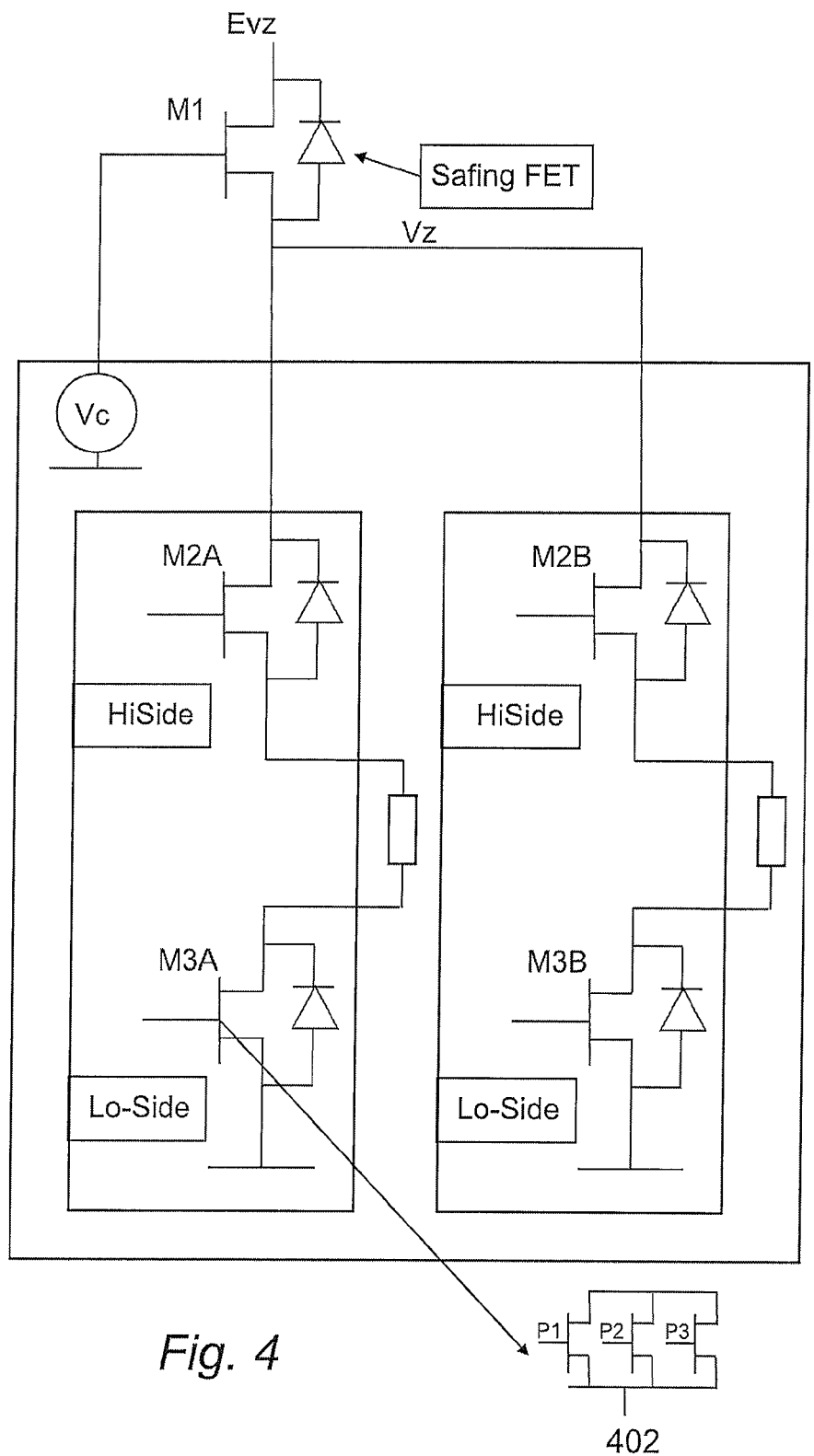
FIG. 4 is a basic circuit diagram similar to FIG. 3 showing a second balancing technique in accordance with one embodiment of the present invention.

FIG. 4 offers an alternative rebalancing technique. If the squib resistance varies with time, temperature or whatever then real time rebalancing is required. This squib resistance is known in real time as diagnostics are carried out regularly, for example every 2 ms. Based on this measurement a logic module (not shown) can select the low side resistance by using one or more parallel low side transistors 402. In this example the MOSFET is split into 3 pieces, but may be more or less divided as the case requires. In the example show, P1 has a resistance of 3Ω, P2 of 6Ω and P3 of 2Ω. This results in an overall resistance of: 3Ω for just P1; 2Ω for the parallel connection of P1 and P2; and 1Ω for the parallel connection of P1, P2 and P3. This ability to vary the resistance ensures that $V_Z$ for each squib circuit can be adjusted so that firing current can be optimised, by connecting the sections or pieces of the MOSFET in parallels.

Figure 5:
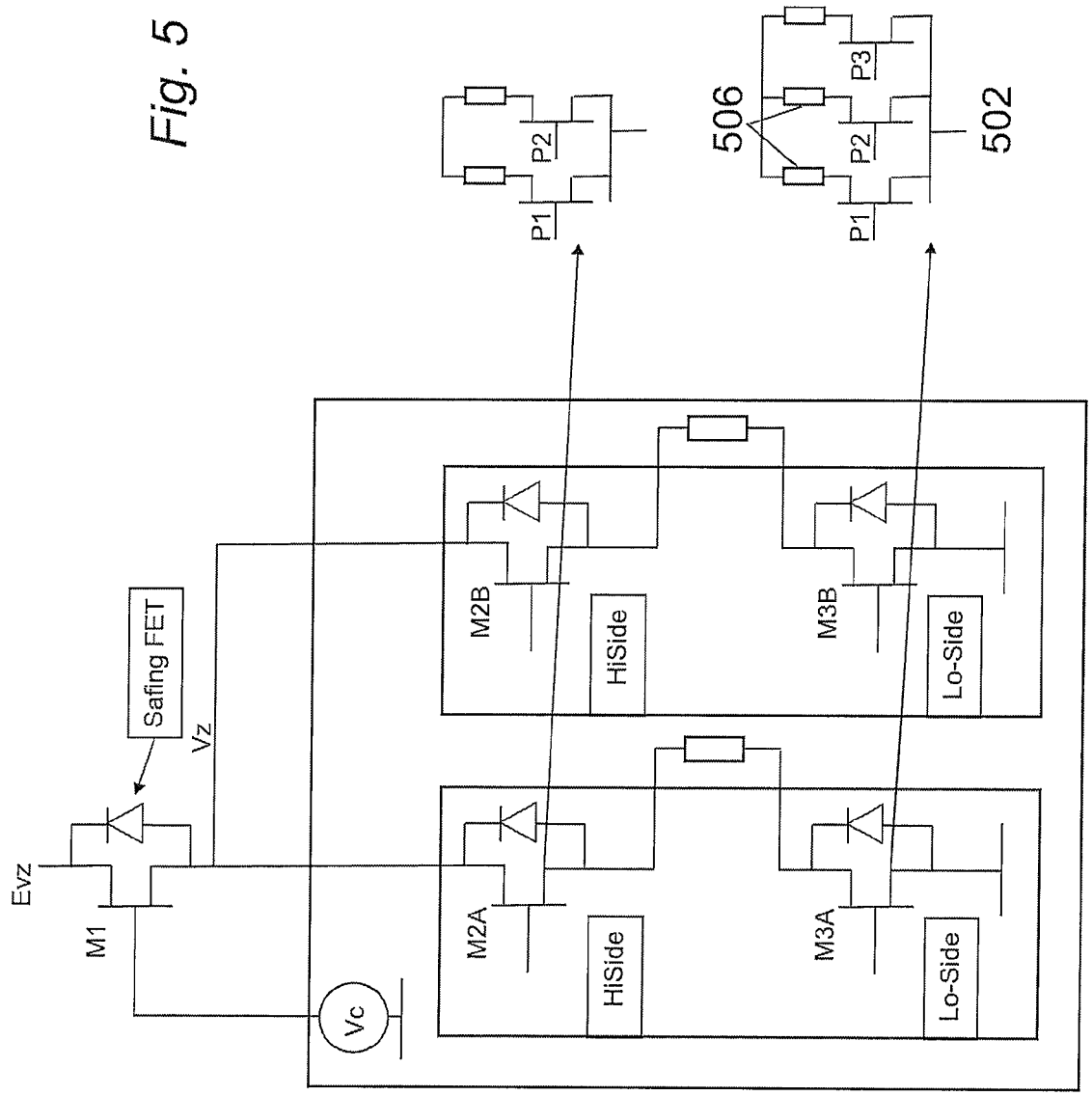
FIG. 5 is a basic circuit diagram similar to FIG. 3 showing a third balancing technique in accordance with one embodiment of the present invention.

FIG. 5 shows a further improvement with respect to rebalancing particularly where temperature impacts the circuits and resistances. The high side MOSFET M2, can be split 504 in the same way as the low side 502 into X parallel structures (where X is a number greater than 1). In addition the total resistance can be further split by inclusion of a poly-silicon resistance 506 in series with each MOSFET. In the example shown at 502 and 504 the poly-silicon resistance may be 0.5Ω. For 502: P1 is 1.0Ω and P3 is 1.3Ω. For 504, the parameters are such that the MOSFET has a resistance Rds (on) of about 1.0Ω maximum at room temperature. This is derived from 1 d 45V, wg=325 ng=50.

As has previously been noted this digital squib driver has many advantages over the previous analogue squib drives. Not least in respect of size, reduced requirement for sustaining energy, no regulator current needed for high and low side switches, simplified pre-driver circuits (not shown) can be used; improved current management especially when squib resistance changes with time and/or temperature.

The embodiments of the present invention shown in the drawings provide a number of advantages. These include:
- Smaller scale MOSFETS are required as energy is totally dissipated which brings about increased reliability at lower cost.
- The high-side switch does not need to sustain the same levels of energy and are thus dramatically reduced in size. For example sizes of <0.08 mm² may be achieved.
- The high-side predriver is converted to a pure inverter driver that does not need to regulate current. This provides faster design time and faster test time.
- The low side switch is operated in Rds(on) mode which again gives size reduction as for the high-side. There is further no thermal coupling from the high-side switch. The predriver of the low side switch can also be simplified leading to still further size reductions.

The examples of circuit arrangements, values, devices and applications are shown by way of example only and may be varied whilst still providing the advantages of the invention.

The invention claimed is:

1. A driving circuit for generating a required firing current for a safety device comprising:
a driving arrangement of a first transistor connected in series with a second transistor; and
a safing power control transistor connected in series with the first transistor;
wherein, when in operation the first and second transistors operate in fully switched on mode and the required firing current is generated varying the voltage across the gate-source of safing power control transistor and the first and second transistors in a predetermined manner.

2. A driving circuit as claimed in claim 1, further comprising a balancing element associated with the driving arrangement of the first and second transistors.

3. A driving circuit as claimed in claim 2, wherein the balancing element comprises a plurality of resistive elements in the driving arrangement of the first and second transistors.

4. A driving circuit as claimed in claim 3, wherein the voltage is varied in response to measurements of the resistance of the first and second transistors and of the safety device.

5. A driving circuit as claimed in claim 4, comprising more than one driving arrangement of said first and second transistors, wherein the arrangements are connected in parallel for providing one or more required firing current for one or more safety devices.

6. A driving circuit as claimed in claim 3, comprising more than one driving arrangement of said first and second transistors, wherein the arrangements are connected in parallel for providing one or more required firing current for one or more safety devices.

7. A driving circuit as claimed in claim 3, wherein the balancing element comprises a series impedance.

8. A driving circuit as claimed in claim 3, wherein the balancing element prevents simultaneous generation of the required firing current.

9. A driving circuit as claimed in claim 3, wherein the safety device includes a squib which is fired by the required firing current.

10. A driving circuit as claimed in claim 3, wherein the safety device includes an airbag activated by the required firing current.

11. An integrated circuit including a driving circuit as claimed in claim 3.

12. A method of activating a safety device by generating a required firing current using a driving circuit comprising a driving arrangement of a first transistor connected in series with a second transistor; and a safing power control transistor connected in series with the first transistor; the method comprises:
operating the first and second transistors in fully switched on mode and varying the voltage across the safing power control transistor and the first and second transistors in a pre-determined manner in order to generate the required firing current.

13. A driving circuit as claimed in claim 12, comprising more than one driving arrangement of said first and second transistors, wherein the arrangements are connected in parallel for providing one or more required firing current for one or more safety devices.

14. A driving circuit as claimed in claim 12, further comprising a balancing element associated with the driving arrangement of the first and second transistors.

15. A driving circuit as claimed in claim 14, wherein the balancing element prevents simultaneous generation of the required firing current.

16. The method of claim 12, wherein the driving circuit further comprises a balancing element associated with the driving arrangement of the first and second transistors, wherein the balancing element comprises a plurality of resistive elements in the driving arrangement of the first and second transistors.

17. A driving circuit for generating a required firing current for a safety device comprising:
a driving arrangement of a first transistor connected in series with a second transistor:
a safing power control transistor connected in series with the first transistor; and
a balancing element associated with the driving arrangement of the first and second transistors, wherein the balancing element comprises a series impedance, wherein the balancing element prevent simultaneous generation of the required firing current, and wherein the balancing element comprises a plurality of resistive elements in the driving arrangement of the first and second transistors;

wherein, when in operation the first and second transistors operate in fully switched on mode and the required firing current is generated by varying the voltage across the gate-source of the safing power control transistor and the first and second transistors in a predetermined manner.

* * * * *

UNITED STATES PATENT AND TRADEMARK OFFICE
CERTIFICATE OF CORRECTION

PATENT NO. : 8,203,822 B2
APPLICATION NO. : 12/598307
DATED : June 19, 2012
INVENTOR(S) : Erwan Hemon et al.

Page 1 of 1

It is certified that error appears in the above-identified patent and that said Letters Patent is hereby corrected as shown below:

At column 3, line 63, please change "gate-source of safing power" to -- gate-source of the safing power --

Signed and Sealed this
Fifth Day of February, 2013

Teresa Stanek Rea
*Acting Director of the United States Patent and Trademark Office*